United States Patent
Morimoto et al.

[11] Patent Number: 6,005,643
[45] Date of Patent: Dec. 21, 1999

[54] DATA HIDING AND EXTRACTION METHODS

[75] Inventors: Norishige Morimoto; Junji Maeda, both of Tokyo-to, Japan

[73] Assignee: International Business Machines Corporation, Armonk, N.Y.

[21] Appl. No.: 08/922,701

[22] Filed: Sep. 2, 1997

[30] Foreign Application Priority Data

Oct. 15, 1996 [JP] Japan .................................. 8-272721

[51] Int. Cl.⁶ .............................. H04N 7/08; H04N 7/36
[52] U.S. Cl. ............................. 348/845; 348/409; 380/10
[58] Field of Search .................................. 348/409, 845; 382/100, 232; 380/9, 10

[56] References Cited

U.S. PATENT DOCUMENTS

| | | | |
|---|---|---|---|
| 5,689,587 | 11/1997 | Bender | 382/232 |
| 5,721,788 | 2/1998 | Powell | 382/100 |
| 5,768,426 | 6/1998 | Rhoads | 382/232 |

FOREIGN PATENT DOCUMENTS 8-159330  6/1996  Japan .

*Primary Examiner*—Howard Britton
*Attorney, Agent, or Firm*—Scully, Scott, Murphy & Presser; Jay P. Sbrollini, Esq.

[57] ABSTRACT

A method for embedding additional information into a video movie without substantially having an influence on the compression efficiency of the video movie and also without substantially causing degradation of the picture quality. Particularly, the method of the present invention involves specifying at least one embedding region in the frame of the video movie for embedding information, and determining a type of interframe prediction of the embedding region in correspondence with information to be embedded by referring to an embedding rule where a content of data to be embedded is caused to correspond to the type of interframe prediction of the embedding region. It is desirable that the frame in which the embedding region exists is a bidirectionally predictive-coded frame.

22 Claims, 4 Drawing Sheets

DATA HIDING AND EXTRACTION METHODS

BACKGROUND OF THE INVENTION

1. Technical Field

The present invention relates to a data hiding method for hiding message data into media data and a data extracting method for extracting hidden data.

2. Prior Art

With the development of multimedia society, large quantities of digital video and audio information have been circulated on internet systems or as CD-ROM software. For digital video and audio information, anybody can easily create a perfect copy without degradation, so the illegal use and the protection of the copyright are becoming problematic. In order to prevent a third party from illegally copying media data such as video and audio data, the technique of hiding additional information, such as the signature of a creator (author), into original media data is becoming the focus of attention. When digital video data or other similar data is illegally copied, it can be known whether or not the copy is an illegal one by confirming the signature hidden in the copy and specifying the source. A hiding technique such as this is called data hiding. FIG. 1 shows a half-tone image obtained when digital data is displayed on a display. In the media data of FIG. 1(a) which is a digital image, messages, such as a nurse, a river, kindergarten pupil, and birds, have been hidden as shown in FIG. 1(b). Media data is obtained by segmenting an image (obtained, for example, from a photograph) into very fine parts and numerically expressing brightness and a hue for each part. At that time, the original numerical value of the image is slightly changed intentionally. If there is a small change in the numerical value, there will be almost no disturbance in the image and humans will not sense the disturbance. If this nature is skillfully utilized, entirely different information (message data) can be hidden in original video. This message data may be any information, for example, lattice patterns, rulers, or signatures of video creators. The message data hidden in media data can be extracted by processing it with a special program. Therefore, based on the extracted message data, it can be checked whether the media data has been altered.

Incidentally, the Moving Picture Experts Group (MPEG) is well known as one of the methods of compression for motion images (video data). In the case where some additional information is put into an MPEG video bitstream, a method of hiding additional information into a user data field has generally been employed. In such a method, however, the field can be easily separated from the media data, so there is the problem that the detection and removal of additional hidden information are easy.

SUMMARY OF THE INVENTION

In view of the aforementioned problem, an objective of the present invention is to provide a novel method for embedding additional information into a motion image compressed by employing interframe prediction. Another objective of the present invention is to provide a method where there will be almost no degradation in picture quality even if additional information is embedded in a motion image. Still another objective of the present invention is to make it difficult to remove embedded information from a motion image.

Specifically, the present invention is related to a data hiding method which embeds information into a motion image constituted by a plurality of frames. The data hiding method comprises the steps of: specifying at least one embedding region in the frame for embedding information; and determining a type of interframe prediction of the embedding region in correspondence with information to be embedded by referring to an embedding rule where a content of data to be embedded is caused to correspond to the type of interframe prediction of the embedding region. It is desirable that the frame in which the embedding region exists is a bidirectionally predictive-coded frame.

In this case, it is desirable that the type of interframe prediction is selected from forward prediction, backward prediction, bidirectional prediction, and intraframe coding. It is also desirable that the embedding rule causes one of bit values to correspond to the bidirectional prediction and the other bit value to correspond to the forward prediction or the backward prediction. Furthermore, the embedding rule may cause data embedding inhibition to correspond to the intraframe coding.

Also, when a prediction error in the type of interframe prediction of the embedding region, determined based on the embedding rule, exceeds a predetermined threshold value, it is desirable to inhibit embedding of data to the embedding region. Since the prediction type of the embedding region is forcibly decided based on the embedding rule, there is the possibility that degradation of picture quality will occur. Hence, a threshold value is provided as a standard of judgment for picture quality, and by employing the embedding rule, it is effective that data is not embedded at a position where a prediction error exceeds a threshold value. In addition, when a number of references of the forward prediction or a number of references of the backward prediction in the bidirectionally predictive-coded frame is less than a predetermined number, embedding of data to the embedding region of the bidirectionally predictive-coded frame may be inhibited. For example, if scene change takes place, the number of references of forward prediction or the number of references of backward prediction in the frame related to the change will be considerably reduced. In such a case, if the embedding rule is applied and the prediction type is forcibly determined, there will be the possibility that picture quality will be considerably degraded. Therefore, if the number of references of prediction in a frame is counted and less than a predetermined threshold value, it is desirable that data is not embedded into the frame. Therefore, another invention provides a data hiding method which embeds information into a motion image constituted by a plurality of frames. The data hiding method comprises the steps of: counting a number of references of forward prediction or a number of references of backward prediction in a frame having an embedding region for embedding information; determining characteristics of the respective embedding regions in correspondence with information to be embedded by referring to an embedding rule where a content of data to be embedded is caused to correspond to a characteristic of the embedding region, when the number of references is greater than a predetermined number; and inhibiting embedding of data to the embedding region of the frame when the number of references is less than the predetermined number.

The present invention further relates to a data hiding method which embeds information with redundancy into an image. First, a plurality of embedding regions are specified in the image for embedding the same information. Then, the same data is embedded in respective embedding regions in correspondence with information to be embedded by referring to an embedding rule. For example, consider the case where a data bit of 1 is embedded in three embedding regions. By referring to an embedding rule which prescribes the value of a data bit and the characteristic (e.g., type of prediction) of an embedding region, three embedding regions are determined so that they have the same characteristic corresponding to the value of the data bit of 1.

The present invention still further relates to a data extraction method which extracts information embedded into an encoded motion image. At least one embedding region, is specified in a frame. Data, embedded in the specified embedding region, is extracted by referring to an extraction rule where the type of interframe prediction is caused to correspond to a content of data to be extracted.

It is desirable that the frame in which the embedding region exists is a bidirectionally predictive-coded frame. Also, it is desirable that the type of the interframe prediction be selected from forward prediction, backward prediction, bidirectional prediction, and intraframe coding.

Also, the extraction rule may cause one of bit values to correspond to the bidirectional prediction and the other bit value to correspond to the forward prediction or the backward prediction. Furthermore, the extraction rule may cause the intraframe coding to correspond to data embedding inhibition.

Still even further, the present invention relates to a data extraction method which extracts information with redundancy embedded into an image. The data extraction method comprises the steps of specifying in the image a plurality of embedding regions embedded with certain data (e.g., a data bit of 1) and extracting the embedded data (aforementioned data bit of 1), based on characteristics of the respective embedding regions, by referring to an extraction rule where a characteristic of the embedding region is caused to correspond to a data bit to be extracted. Here, when different data bits are extracted from the respective embedding regions, the number of the embedding regions may be compared for each of the extracted different data bits, and the data bit with a greater number may be specified as embedded information (so-called decision by majority). For example, assume that the data bits, extracted from three embedding regions A, B, and C in which the same data bit (a data bit of 1) should have been embedded, are a bit value of 1, a bit value of 1, and a bit value of 0. In this case, the number of the embedding regions which extracted a bit value of 1 is 2, and the number of the embedding regions which extracted a bit value of 0 is 1. Since it can be said that a bit value, where the aforementioned number is greater, is more accurate, it is recognized that a data bit of 1 has been embedded. If a data bit of 1 has been embedded, the data bit value which is extracted from three embedding regions will be 1. However, for some reason, there are cases where embedded information is changed. Also, extraction employing a statistical method is considered. Hence, a method of extracting information with redundancy embedded into an image, such as the fourth invention, is effective.

Still further, the present invention relates to a motion image coding system for embedding information into videodata which is constituted by a plurality of frames and which employs interframe prediction. The system comprises an error calculator which calculates a first prediction error, based on both an embedding region specified in a first frame for embedding information and a reference region in a second frame which is referred to by the embedding region, by employing forward prediction, which also calculates a second prediction error, based on both the embedding region and a reference region in a third frame which is referred to by the embedding region, by employing backward prediction, and which furthermore calculates a third prediction error, based on the embedding region and reference regions in the second and third frames which are referred to by the embedding region, by employing bidirectional prediction. The system further comprises a decider. The decider decides a type of interframe prediction in the embedding region in correspondence with a content of information to be embedded by referring to an embedding rule which prescribes that when one data bit is embedded in the embedding region, the type of interframe prediction in the embedding region employs either the forward prediction or the backward prediction and which also prescribes that when another data bit is embedded in the embedding region, the type of the interframe prediction employs the bidirectional prediction. The decider also specifies any one of the first, the second, or the third prediction error in correspondence with the decided type of interframe prediction. Here, the aforementioned decider may include first inhibition means which inhibits embedding of data to a certain embedding region when a prediction error in the type of interframe prediction of the certain embedding region, determined based on the embedding rule, exceeds a predetermined threshold value. Also, the decider may include second inhibition means which inhibits embedding of data to the embedding region of the bidirectionally predictive-coded frame when a number of references of the forward prediction or a number of references of the backward prediction in the bidirectionally predictive-coded frame is less than a predetermined number.

The present invention is also directed to a motion image decoding system for extracting information embedded into a coded motion image. This system comprises a specifier which specifies at least one region in which information is embedded. Also, the system comprises an extractor which extracts the embedded information from a type of the interframe prediction in the embedding region by referring to an extraction rule where the type of the interframe prediction in the embedding region is caused to correspond to a content of information to be embedded.

The present invention is still further directed to a program storage medium for executing a data hiding process, which embeds information into a motion image constituted by a plurality of frames, by a computer. The program storage medium has the steps of: specifying in a frame at least one embedding region into which information is embedded; and deciding a type of the interframe prediction in the embedding region in correspondence with information to be embedded by referring to an embedding rule where a content of information to be embedded is caused to correspond to the type of interframe prediction in the embedding region.

The present invention also relates to a program storage medium for executing a data extracting process, which extracts information embedded into an encoded motion image, by a computer. The program storage medium has the steps of: specifying in a frame at least one embedding region in which information is embedded and extracting the embedded information in correspondence with a type of the interframe prediction in the embedding region by referring to an extraction rule where the type of interframe prediction in the embedding region is caused to correspond to a content of data to be extracted.

BRIEF DESCRIPTION OF THE DRAWINGS

Preferred embodiments of the present invention will now be described, by way of example only, with reference to the accompanying drawins, in which.

DETAILED DESCRIPTION OF THE PREFERRED EMBODIMENT OF THE INVENTION (1) Data Embedding Initially, a description will be made of the case where some additional information (message data) is embedded into an MPEG video bitstream (media data).

Figure 1A:
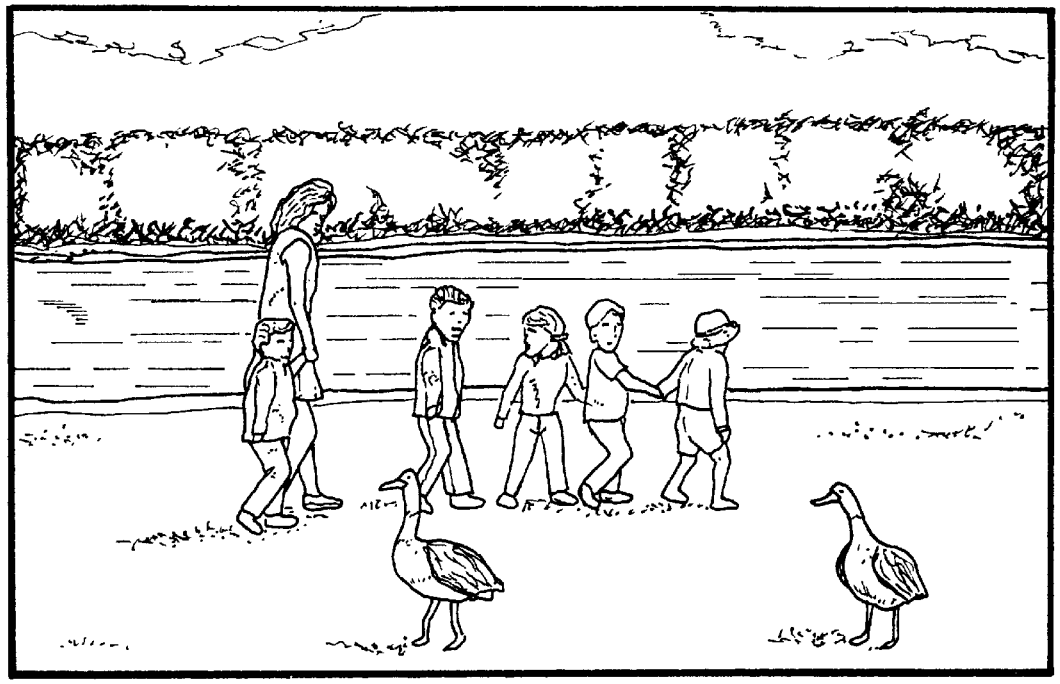
FIG. 1 is a half-one image obtained when digital data is displayed on a display.
Figure 1B:
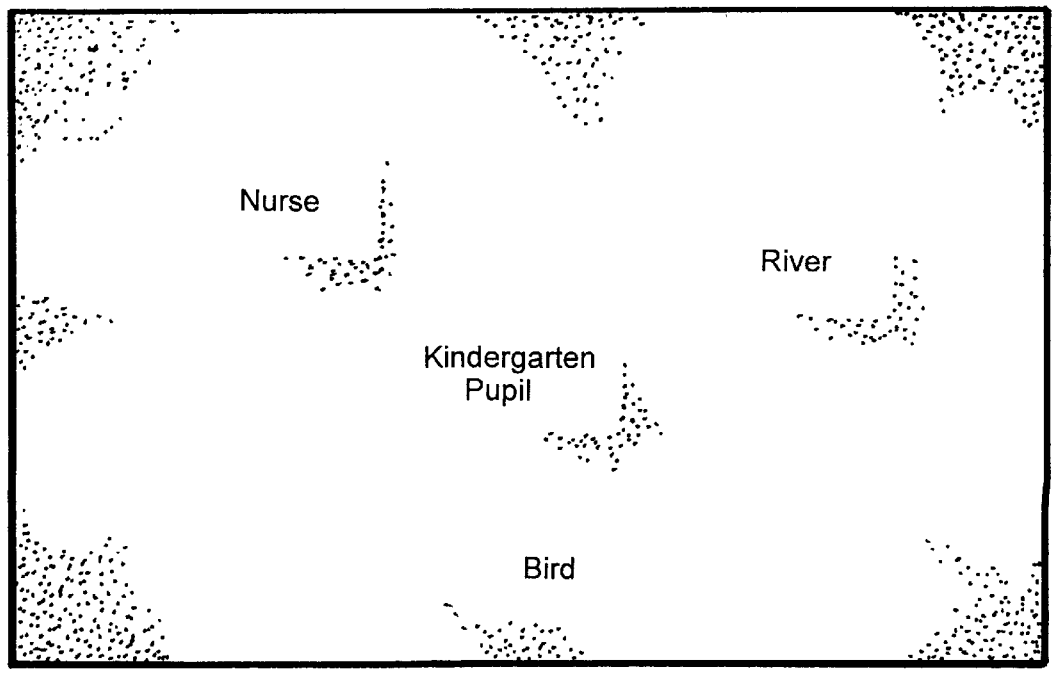
Figure 2:
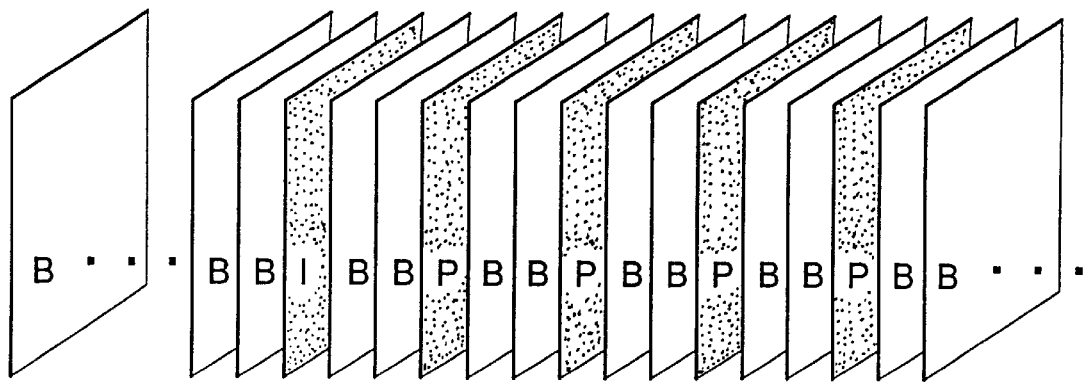
FIG. 2 is a diagram showing an example of arrangement of type of interframe prediction.

The MPEG employs the forward prediction based on a reference frame in the past, the backward prediction based on a reference frame in the future, and the bidirectional prediction based on reference frames both in the past and the future. FIG. 2 shows a sequence of frames. As shown in the figure, the sequence of frames contain three types of frames, an I-frame, P-frames, and B-frames, in order to realize bidirectional prediction.

Here, the I-frame is an intracoded frame, and all macroblocks within this frame are compressed by intraframe coding (without interframe prediction). The P-frame is a (forward) predictive-coded frame, and all macroblocks within this frame are compressed by intraframe coding or forward predictive coding. Furthermore, the B-frame is a bidirectionally predicted, interpolative-coded frame. The macroblocks within the B-frame can be basically encoded by employing forward prediction, backward prediction, bidirectional prediction or intraframe coding. The I-frame and P-frames are encoded in the same order as the original motion image. On the other hand, the B-frames are inserted between the I-frame and the P-frames, and after the I- and P-frames are processed the B-frames are encoded.

Figure 3:
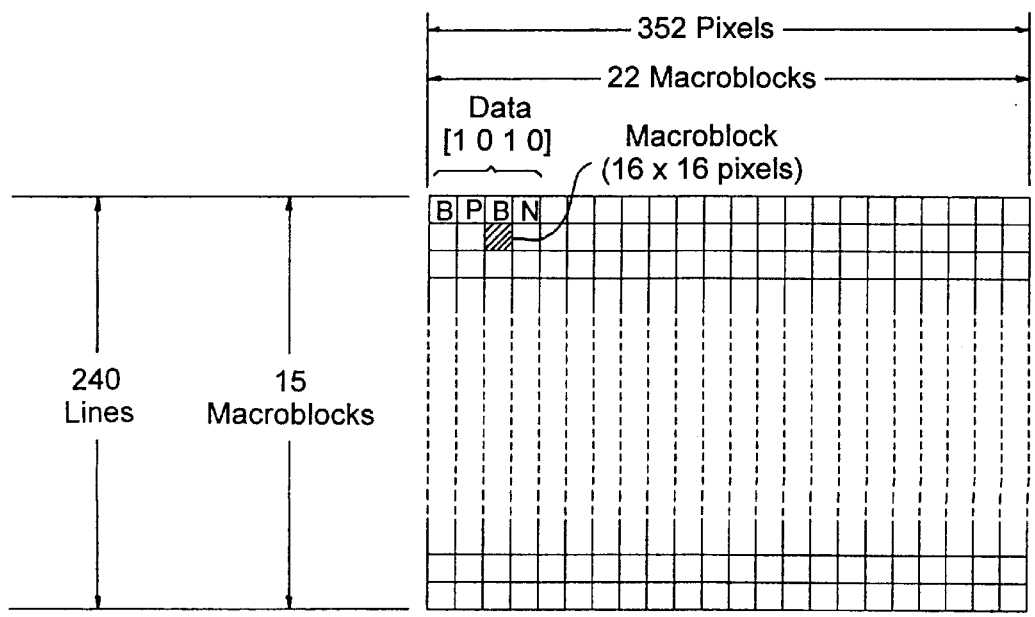
FIG. 3 is a diagram showing an example of macroblocks in a B-frame.

The information (message data) embedding region is the macroblocks of the B-frame, and 1 bit of information can be embedded with respect to 1 macroblock. Therefore, when message data is constituted by a number of bits, there is the need to perform the embedding process with respect to the macroblocks corresponding in number to the bits. FIG. 3 is a diagram showing the arrangement of macroblocks in a B-frame. The macroblock is the unit of prediction. The macroblock is the 16×16 unit of motion-compensation, which compresses videodata by reducing their temporal redundancy.

The macroblocks within the B-frame can be classified into the following four groups as prediction types.

Intracoded Macroblock

The intracoded macroblock is a macroblock that is coded only by the information in the macroblock itself without performing interframe prediction.

Forwardly Predicted Macroblock

The forward predicted macroblock is a macroblock that is forwardly predicted and encoded by referring to either the intracoded frame (I-frame) in the past or the forward predictive-coded frame (P-frame) in the past. Specifically, a square region of 16 pixels×16 pixels, which is most similar in the past reference frame, is retrieved, and the macroblock has a prediction error (ΔP) which is the difference between it and the retrieved square region and also has information about a spatial relative position (a motion vector). Here, the prediction error ΔP is expressed as the brightness difference or the color difference obtained for 16 pixels×16 pixels. Note that how a similar square region is selected depends upon encoders.

Backwardly Predicted Macroblock

The backward predicted macroblock is a macroblock that is backwardly predicted and encoded by referring to either the intracoded frame (I-frame) in the future or the forward predictive-coded frame (P-frame) in the future. A region, which is most similar in the future reference frame, is retrieved, and this macroblock has a prediction error (ΔN) which is the difference between it and the retrieved region and also has information about a spatial relative position (a motion vector).

Bidirectionally Predicted Macroblock

The bidirectionally predicted macroblock is a macroblock that is bidirectionally predicted and encoded by referring to the past reference frame and the future reference frame. Both a region most similar in the past reference frame and a region most similar in the future reference frame are retrieved, and this macroblock has a prediction error ((ΔN+ΔP)/2) which is the difference between it and the average (per pixel) of these two regions and also has information about a spatial relative position (two motion vectors) between them.

To embed message data, at least one macroblock, which is given an embedding process, must first be specified in a B-frame. This may be defined, for example, as the respective macroblocks (embedding regions) which exist between the first line and the third line of the B-frame, or it may be defined as the all macroblocks in a certain frame. In addition to the macroblock being previously defined as format in this way, it can also be determined by employing an algorithm which generates a position sequence. Note that the algorithm for generating a position sequence can employ the algorithm disclosed, for example, in Japanese Patent Application No. 8-159330.

Next, with respect to the macroblock specified as an object of an embedding process, 1 bit of data is embedded into 1 macroblock, based on an embedding rule. This embedding rule is one where bit information is caused to correspond to the prediction type of macroblock. For example, there is the following rule.

| (Embedding Rule) | |
|---|---|
| Bit information to be embedded | Interframe prediction type of macroblock |
| Bit 1 | Bidirectionally predicted macroblock (represented by B) |
| Bit 0 | Forwardly predicted macroblock (represented by P) or backwardly predicted macroblock (represented by N) |
| Embedding inhibition | Intracoded macroblock |

For example, consider the case where message data, 1010, are embedded. The 4 bits of data are embedded in sequence in 4 embedding regions (macroblocks) between the left first macroblock and the left fourth macroblock of the first line shown in FIG. 3. First, the first data bit is a 1, so the prediction type of leftmost macroblock (the first embedding region) is determined to be bidirectional prediction (B) in accordance with the aforementioned embedding rule. The prediction error in this case becomes a prediction error which is the difference relative to the average of a region which is most similar in the past reference frame and a region which is most similar in the future reference frame.

The next data bit is a 0. Therefore, the prediction type of the second macroblock (the second embedding region) is either forward prediction (P) or backward prediction (N) in accordance with the embedding rule. In this case, in order to suppress the quality degradation of an image, the prediction error in the forward prediction and the prediction error in the backward prediction are compared to select the type where the prediction error is smaller. In the example of FIG. 3, since the prediction error in the forward prediction is smaller than that in the backward prediction, the forward prediction (P) is selected for the second macroblock.

Similar procedure is repeatedly applied to the third embedding region and the fourth embedding region. As a consequence, the prediction type of the third macroblock becomes bidirectional prediction (B), and the prediction type of the fourth macroblock is determined to be backward prediction (N) because the prediction error in the backward prediction is smaller.

In the aforementioned way, the interframe prediction types of the first to the fourth embedding regions are BPBN, and 4 data bits 1010 (4 bits of message data) are embedded in these regions. If an attempt is made to embed data bits into a certain embedding region, there will be cases where image quality is considerably degraded. In such cases, the embedding of data bits into the embedding region is not performed, and the prediction type of the embedding region is an intracoded macroblock which represents "embedding inhibition."

(2) Data Extraction

A description will be made of a method of extracting the message data embedded in the aforementioned procedure. In the case where message data is extracted, information for specifying a macroblock in which the message data has been embedded must first be given. The specifying information may be given by an outside unit. Also, it is possible to previously embed the specifying information in data itself. In addition, in the case where the position of an embedding region is standardized or if an algorithm for generating a position sequence is known, message data can be extracted. For a message data extracting method using a position sequence, the technique disclosed in the aforementioned Japanese Patent Application No. 8-159330, for example, can be employed.

Next, from the prediction type in the specified embedding region, the information embedded in that region is extracted by referring to an extraction rule. This extraction rule is a rule where the prediction type of macroblock is caused to correspond to bit information, and this extraction rule has to be given as information when extraction is performed. For example, there is the following rule. It is noted that the corresponding relation between the prediction type in this extraction rule and bit information is the same as that of the aforementioned embedding rule. Also, in the case where the prediction type is an intracoded macroblock, it is judged that in the embedding region, a data bit has not been embedded.

| (Extraction Rule) | |
|---|---|
| Interframe prediction type of macroblock | Bit information to be extracted |
| Bidirectionally predicted | Bit 1 |
| macroblock (represented by B) | |
| Forwardly predicted macroblock (represented by P) or backwardly predicted macroblock (represented by N) | Bit 0 |
| Intracoded macroblock | A data bit has not been embedded |

A description will be made of the case where message data has been embedded as shown in FIG. 3. Assume that it has already been known that message data bits have been embedded as a premise in the embedding regions from the first macroblock, on the left side, to the fourth macroblock of the first line of FIG. 3. Because the prediction type of the leftmost macroblock is bidirectional prediction (B), a bit value of 1 is extracted by referring to the aforementioned extraction rule. The prediction type of the second macroblock is forward prediction (P), so a bit value of 0 is extracted according to the extraction rule. By repeatedly applying the same procedure to the two other macroblocks, a bit value of 1 and a bit value of 0 are extracted in sequence. As a consequence, message data bits 1010 are extracted from these regions.

If the prediction type of the rightmost macroblock is an intracoded macroblock, it will be judged, according to the aforementioned extraction rule, that a data bit has not been embedded in this macroblock. As a consequence, the message data bits become 101.

(3) Attention to Consideration of Picture Quality (Introduction of a Threshold Value)

An encoder can freely select the prediction type of macroblock in the range allowed for each frame. Generally, the prediction type of macroblock where the prediction error is smallest is selected. However, the feature of this embodiment is that the prediction type of macroblock is selected according to the aforementioned embedding rule. Since the relationship between the prediction type and bit information in the extraction rule is identical with that prescribed by the embedding rule, embedded data can be accurately extracted by referring to the extraction rule.

However, if prediction type is determined according to the embedding rule, there will be the possibility that there will be selected the prediction type where the prediction error is so large that quality degradation in an image can be visually recognized. For the prediction error, there are many cases where the sum of absolute values or the sum of squares of prediction errors for each pixel is employed, but MPEG does not prescribe what standard is used, so an encoder is free to use any standard for prediction errors. However, no matter what standard there is, if a prediction type where the prediction error is too large is selected, the quality degradation of an image will occur. Hence, a certain threshold value is previously set to a prediction error. In the case where the prediction error in a selected prediction type is greater than the threshold value, it is desirable that the embedding of a data bit is not performed in the macroblock. In this case, the prediction type of macroblock is made an intracoded macroblock in accordance with the aforementioned embedding rule. This point will be described in further detail in reference to FIG. 4.

Figure 4:
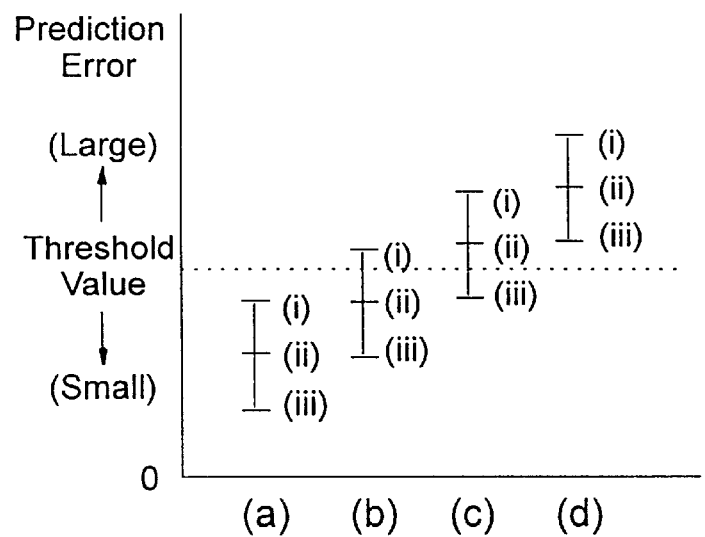
FIG. 4 is a diagram for explaining the relationship between the prediction type and the prediction error of a macroblock.

FIG. 4 is a diagram for explaining the relationship between the prediction type and the prediction error of a macroblock. In the figure, the axis of ordinate represents the prediction error, and a larger prediction error indicates a larger degradation of picture quality. Also, a threshold value has been set as the degree of an allowable prediction error, that is, a standard of judgment where no perceptible degradation of picture quality occurs. In FIG. 4, 3 short horizontal bars (i), (ii), and (iii), linked by a single vertical bar, indicates any of 3 prediction errors of the forward prediction, backward prediction, and bidirectional prediction of a macroblock. From the relationship between a threshold value and 3 prediction errors, a macroblock can be classified into 4 types (a), (b), (c), and (d). That is, the 4 types are the case (type (a)) where 3 prediction errors are all less than a threshold value, the case (type (b)) where any one of prediction errors exceeds a threshold value, the case (type (c)) where 2 prediction errors exceed a threshold value, and the case (type (d)) where all prediction errors exceed a threshold value.

For the macroblock of type (d), even if any type of prediction is selected, all prediction errors will exceed a threshold value and there will be a considerable degradation in picture quality, so it is undesirable to use this type of macroblock as an embedding region. In this case, this macroblock becomes an intracoded macroblock in accordance with the embedding rule. However, in MPEG, most macroblocks in a B-frame have interframe prediction (forward prediction, backward prediction, or bidirectional prediction), and actually there is a low probability that this type of macroblock appears.

For the macroblock of type (a), even if any kind of prediction is selected, there will be no possibility that prediction error will exceed a threshold value. That is, even if any data is embedded, degradation of picture quality will not be conspicuous, so this type of macroblock can be used as an embedding region. Also, even for type (b), even if this block is used as an embedding region, it will appear that perceptible degradation of picture quality will not occur. Usually, there is no possibility that a bidirectional prediction error becomes worst among three prediction errors (i.e., there is no possibility that a bidirectional prediction error is horizontal bar (i)). According to the aforementioned embedding rule, both a bit value of 1 and a bit value of 0 can be embedded into this type of block without exceeding a threshold value. Therefore, when the aforementioned embedding rule is employed, data bits can be embedded into the macroblocks of the types (a) and (b) without substantially causing degradation of picture quality.

For type (c), it is undesirable as a rule to employ this type of block as an embedding region. In the case where a bidirectional prediction error is horizontal bar (iii), a forward prediction error and a backward prediction error both exceed a threshold value, and consequently, picture quality degradation will occur depending on a data bit to be embedded. However, even in this case, when the prediction error in the prediction type corresponding to a data bit to be actually embedded do not exceed a threshold value (e.g., the case where the prediction error, when a certain bit value is embedded according to an embedding rule, is less than a threshold value indicated by horizontal bar (iii)), it is possible to use this type of block as an embedding region.

In view of the aforementioned points, three types of prediction errors are obtained for a certain macroblock in which data is embedded. Then, in the case where the prediction error of the prediction type, decided based on the embedding rule, exceeds a predetermined threshold value, it is desirable to inhibit the embedding of data into this macroblock. In this case, the prediction type of the macroblock into which the embedding of data is inhibited is intraframe coding in accordance with the aforementioned embedding rule.

Note that the intracoded macroblocks of type (c) and (d) become invalid bits which cannot be used as a data embedding region. However, as previously described, the actual rate of occurrence is low, so such invalid bits can be compensated by error correction coding, in the case where information to be embedded is allowed to have redundancy.

According to the embodiment of the present invention, the type of macroblock and a data bit to be embedded are correlated and decided in encoding a motion image. Therefore, message data can be embedded into a motion image without substantially having an influence on the compression efficiency of the motion image and also without substantially causing degradation of picture quality. In addition, it is very difficult to remove message data embedded in this way from a motion image. Furthermore, since the quantity of information to be embedded is almost independent of the content of an image, it is possible to efficiently embed message data.

(4) Attention to Consideration of Picture Quality (Countermeasure to Scene Change)

Figure 5A:
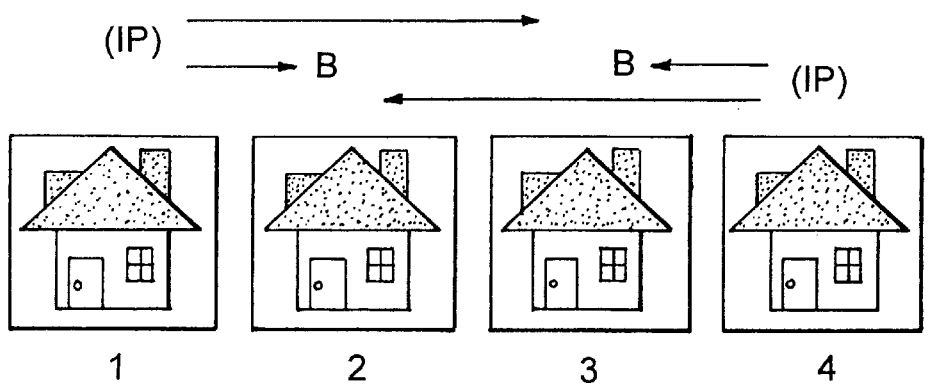
FIG. 5 is a diagram for explaining reference images in the case when scene change takes place.
Figure 5B:
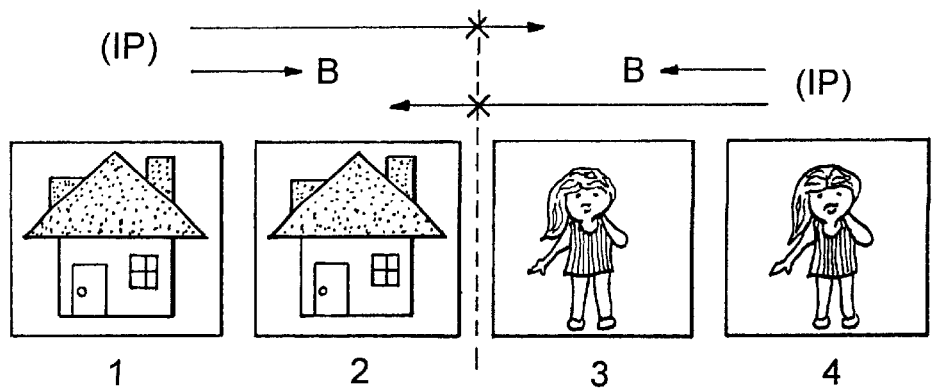

When scene change takes place, it is known that most macroblocks in the B-frames between the I-frame and the P-frame or between the P-frames before and after the change are the types (c) shown in FIG. 4. FIG. 5 is a diagram for explaining reference images in the case when scene change takes place. FIG. 5(a) shows the case when there is no scene change, and FIG. 5(b) shows the case when scene change takes place between frame 2 and frame 3. In the figures, two opposite end frames are I- or P-frames and two center frames are B-frames. Also, an arrow shown in the figures indicates a reference relation between frames.

If there is no scene change, a great number of bidirectionally directed macroblocks are present in the B-frame. However, if scene change, such as that shown in FIG. 5(b), occurs, the number of backwardly and bidirectionally predicted macroblocks in the frame 2 will be considerably reduced and most of the macroblocks will become forwardly predicted macroblocks so that prediction errors will become smaller than the threshold value of FIG. 4. Also, the number of forwardly and bidirectionally predicted macroblocks in the frame 3 will be considerably reduced and most of the macroblocks will become backwardly predicted macroblocks so that prediction errors will become smaller than the threshold value of FIG. 4. Therefore, it is undesirable to embed data into such frames. Hence, the number of forwardly predicted macroblocks and the number of backwardly predicted macroblocks are monitored, and when these numbers are less than a certain threshold value, it is judged that scene change has taken place. In such a case, it is desirable not to embed data into such frames (i.e., according to the embedding rule, it is desirable that prediction type be made an intracoded macroblock.)

(5) Attention to Consideration of Picture Quality (Countermeasure to Occlusion)

Occlusion means that, by moving a certain object, something hidden behind the object suddenly appears or conversely is hidden. When occlusion takes place, the macroblocks related to the occlusion within the entire frame are type (c) shown in FIG. 4. In this case, as previously described, if the prediction error of the prediction type determined according to the embedding rule is less than a threshold value, there will be no problem, but in the case other than that, perceptible degradation of picture quality will occur. When picture quality is of great importance, the degradation can be avoided by employing an error correcting code. That is, 1 bit of information is not expressed with a single macroblock, but rather, redundancy is given to information, and information equivalent to 1 bit is expressed with a plurality of macroblocks. In this case, a single embedding region is constituted by a set of macroblocks.

For example, consider the case where information equivalent to 1 bit is expressed with three macroblocks. In this case, even if one of the three macroblocks were of the prediction type opposite to a data bit to be expressed, the data bit could be accurately expressed with the two remaining macroblocks. If intracoded macroblocks more than a predetermined number are contained in a certain set of macroblocks which express 1 bit of information, a data bit will not be embedded into the set of macroblocks. Conversely, if two or more macroblocks are of type (c) shown in FIG. 4, it is necessary that some of the macroblocks become intracoded macroblocks to clearly indicate that data has not been embedded. This can also be utilized in the embedding and extraction using a statistical technique. That is, each time statistical nature appears, a plurality of embedding regions (e.g., 100 regions) are prepared, and 1 bit of information may be expressed with a plurality of regions. In that sense, the redundancy in the present invention means that 1 bit of information is not caused to correspond to a single region to be processed with a relation of one-to-one, but rather it is caused to correspond to a plurality of regions.

When occlusion takes place, it is considered that a plurality of mutually adjacent macroblocks existing in the portion related to the occlusion are of the type (c) shown in FIG. 4. In view of such a point, for a set of macroblocks which constitutes an error correcting code, it is desirable to utilize macroblocks which are present at a position away from each other in the frame.

While the aforementioned embodiment has been described with reference to MPEG, the present invention is not limited to MPEG. It is taken as a matter of course that the present invention is applicable to some other image compression methods using an interframe prediction coding technique. In that sense, the embedding region in the present invention is not limited to macroblocks.

The aforementioned embedding rule and extraction rule are merely examples, so the present invention are not limited to these rules but it can employ various rules. For example, it is also possible to embed three data values into a single macroblock by causing a forwardly predicted macroblock, a backwardly predicted macroblock, and a bidirectionally predicted macroblock to correspond to bit values of 0, 1, and 2, respectively.

Furthermore, while the aforementioned embodiment has been described with reference to the B-frame, that is, a bidirectionally predicted frame, it is also possible to embed data into the aforementioned P-frame. Since the macroblocks constituting the P-frame are forwardly predicted macroblocks and an intracoded macroblock, bit values can be caused to correspond to these macroblocks. However, from the viewpoint of suppressing degradation of picture quality and an increase in a quantity of data, as previously described, it is desirable to embed data into the B-frame rather than into the P-frame. The reason is that if a macroblock which is an intracoded macroblock is forcibly made a forwardly predicted macroblock by the embedding rule, the picture quality will be degraded and, in the opposite case, the data quantity will be increased.

(6) Motion image coding system

Figure 6:
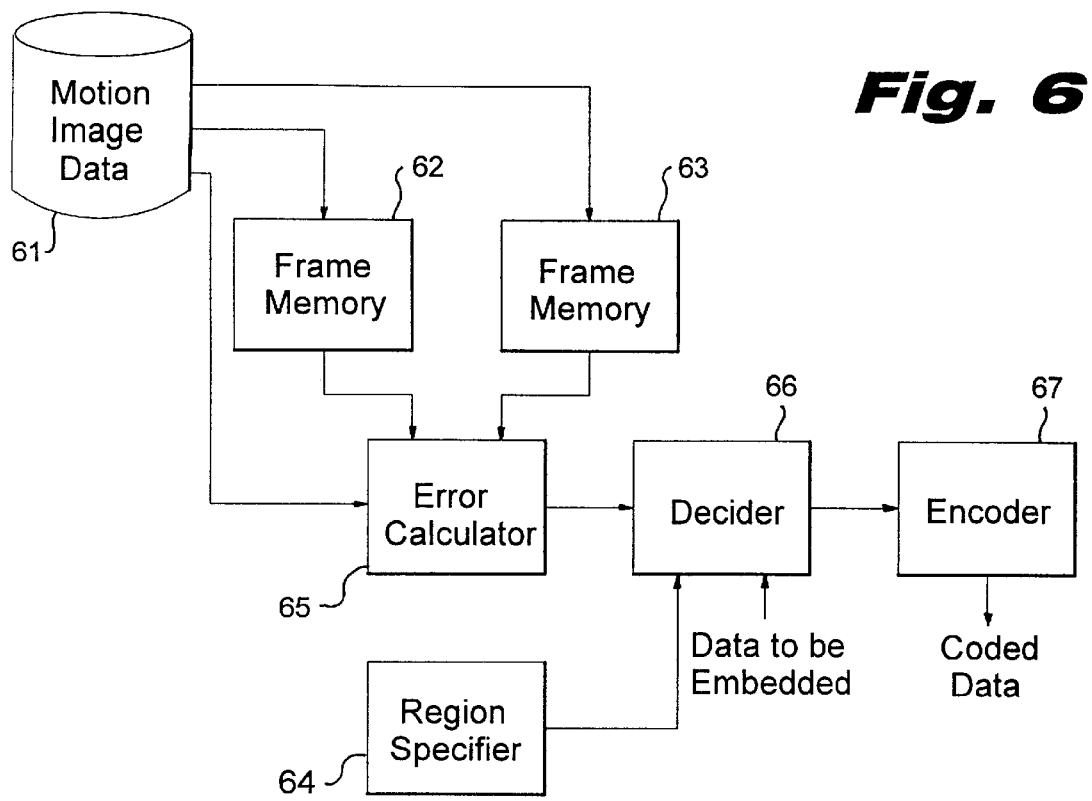
FIG. 6 is a block diagram of a motion image coding system.

FIG. 6 is a block diagram of a motion image coding system employing the present invention. Memory 61 stores motion image data consisting of a plurality of frames. Frame memory 62 stores a past reference frame and frame memory 63 stores a future reference frame in display order. A region specifier 64 specifies a position at which data is embedded as additional information. Therefore, at least one region is specified in a frame. An error calculator 65 calculates a forward prediction error, a backward prediction error, and a bidirectional prediction error, based on the data stored on the frame memories 62 and 63. The forward prediction error is calculated, from both an embedding region and a reference region in the past reference frame which is referred to by the embedding region, by employing forward prediction. The backward prediction error is calculated, from both an embedding region and a reference region in the future reference frame which is referred to, by the embedding region by employing backward prediction. Furthermore, the bidirectional prediction error is calculated, from an embedding region and reference regions in both the past and future reference frames which are referred to by the embedding region, by employing bidirectional prediction. A decider 66 embeds data to be embedded into an embedding region by controlling the characteristic of a region which is an embedding region by referring to an embedding rule. Specifically, the embedding rule prescribes that when a single data bit is embedded in an embedding region, the prediction type in the embedding region employs either forward prediction or backward prediction. Also, when the other data is embedded, it prescribes that the prediction type employs bidirectional prediction. The decider 66 decides the type of interframe prediction in an embedding region in correspondence with the content of information to be embedded, also specifies a reference region which is referred to by an embedding region in correspondence with the decided type of interframe prediction, and furthermore specifies either one of the first, the second, or the third prediction error. Thereafter, an encoder 67 encodes the signal which was output from the decider 66.

Here, the decider 66 is designed so that, for a certain embedding region, when the prediction error in the type of interframe prediction decided based on the embedding rule exceeds a predetermined threshold value, the embedding of data to that embedding region is inhibited. With this, picture quality is prevented from being degraded by embedding. The decider 66 is also designed so that when the number of references of forward prediction or the number of references of backward prediction in a bidirectionally predicted frame is less than a predetermined number, the embedding of data to an embedding region in that frame is inhibited. By counting the number of references, scene change can be detected. Thus, when scene change takes place, the embedding of data to the frame related to the change is inhibited. As a consequence, picture quality degradation can be prevented.

(7) Motion Image Decoding System

Figure 7:
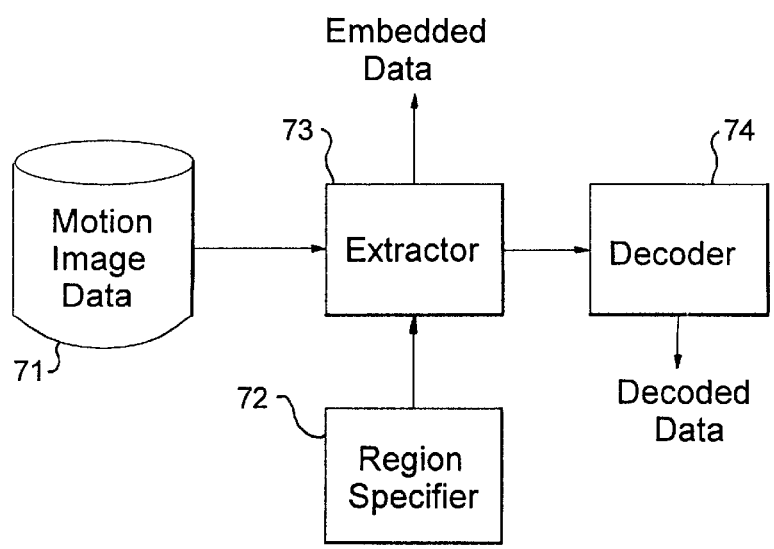
FIG. 7 is a block diagram of a motion image decoding system.

FIG. 7 is a block diagram of a motion image decoding system employing the present invention. Memory 71 stores encoded motion image data into which additional information is embedded. A region specifier 72 specifies at least one embedding region into which additional information is embedded in a frame. Extracting means 73 extracts additional information, embedded in an embedding region, from the type of interframe prediction in the embedding region by referring to the extraction rule. Then, an decoder 74 decodes the encoded data which was output from the extractor 73, thereby reconstructing a motion image.

(8) Embedding of Fingerprint

In MPEG, B-frames are not referred to by other frames, so even if the prediction type of macroblock in the B-frame were changed, there would be no possibility that the change would have an influence on other frames. By utilizing this fact, a fingerprint can be embedded. The fingerprint is specific information different for each owner. A typical utilization example of the fingerprint is the case where, when motion image data is issued to a third party, the issuer previously embeds a mark in the motion image data so that the third party which is a receiving station can be specified. If done in this way, the source of a copy can be specified when an illegal act, such as illegal copy, is performed. Therefore, if the videodata is illegally circulated, there could be a fee for any illegal copy. Also, a cryptographed video product is given legal owner's registration information, and a fingerprint can be embedded in correspondence with the registration information.

In the case where a fingerprint is embedded, basically both "bidirectionally predicted macroblock" and "forwardly predicted macroblock or backwardly predicted macroblock where the prediction error is smaller," which are generated when MPEG encoding is performed, have been held. Then, a suitable macroblock is selected in correspondence with a third party which is a receiving station. Even if done in this way, there would be no influence on other frames or a data layer (e.g., a slice layer) which is higher than the macroblock layer of the corresponding frame. According to the present invention, message data can be embedded into a motion image without substantially having an influence on the compression efficiency of the motion image and also without substantially causing degradation of picture quality. In addition, since message data is embedded in a part essential to the code of the motion image, it is difficult to remove the message data from the motion image without degrading picture quality. Furthermore, since the quantity of information to be embedded is almost independent of the content of the videodata, it is possible to efficiently embed message data.

While the invention has been particularly shown and described with respect to preferred embodiments thereof, it will be understood by those skilled in the art that the foregoing and other changes in form and details may be made therein withour departing from the spirit and scope of the invention.

Having thus described our invention, what we claim as new, and desire to secure by Letters Patent is:

1. A data hiding method for embedding information into a motion image constituted by a plurality of frames, comprising the steps of:
    specifying at least one embedding region in the frame for embedding information; and
    determining a type of interframe prediction of said embedding region in correspondence with information to be embedded by referring to an embedding rule where a content of data to be embedded is caused to correspond to the type of interframe prediction of said embedding region.

2. The data hiding method as set forth in claim 1, wherein said frame in which said embedding region exists is a bidirectionally predictive-coded frame.

3. The data hiding method as set forth in claim 2, wherein said type of interframe prediction is selected from forward prediction, backward prediction, bidirectional prediction, and intraframe coding.

4. The data hiding method as set forth in claim 3, wherein said embedding rule causes one of bit values to correspond to said bidirectional prediction and the other bit value to correspond to said forward prediction or said backward prediction.

5. The data hiding method as set forth in claim 4, wherein said embedding rule further causes data embedding inhibition to correspond to said intraframe coding.

6. The data hiding method as set forth in claim 1, further comprising:
    a step of inhibiting embedding of data to a certain embedding region when a prediction error in the type of interframe prediction of said certain embedding region, determined based on said embedding rule, exceeds a predetermined threshold value.

7. The data hiding method as set forth in claim 6, further comprising:
    a step of inhibiting embedding of data to said embedding region of said bidirectionally predictive-coded frame when a number of references of said forward prediction or a number of references of said backward prediction in said bidirectionally predictive-coded frame is less than a predetermined number.

8. A data hiding method for embedding information into a motion image constituted by a plurality of frames, comprising the steps of:
    counting a number of references of forward prediction or a number of references of backward prediction in a frame having an embedding region for embedding information;
    determining characteristics of said respective embedding regions in correspondence with information to be embedded by referring to an embedding rule where a content of data to be embedded is caused to correspond to a characteristic of said embedding region, when said number of references is greater than a predetermined number; and
    inhibiting embedding of data to said embedding region of said frame when said number of references is less than said predetermined number.

9. A data hiding method for embedding information into an image, comprising the steps of:
    specifying a plurality of embedding regions in said image for embedding the same information; and
    determining said respective embedding regions so that they have the same characteristic in correspondence with information to be embedded by referring to an embedding rule where a content of data to be embedded is caused to correspond to a characteristic of said embedding region, and embedding the same data into said respective embedding regions.

10. A data extraction method for extracting information embedded into a motion image, comprising the steps of:
    specifying at least one embedding region embedded with information; and
    extracting the embedded information from a type of said interframe prediction in the embedding region by referring to an extraction rule where the type of said interframe prediction in said embedding region is caused to correspond to a content of data to be extracted.

11. The data extraction method as set forth in claim 10, wherein said frame in which said embedding region exists is a bidirectionally predictive-coded frame.

12. The data hiding method as set forth in claim 11, wherein the type of said interframe prediction is selected from forward prediction, backward prediction, bidirectional prediction, and intraframe coding.

13. The data hiding method as set forth in claim 12, wherein said extraction rule causes one of bit values to correspond to said bidirectional prediction and the other bit value to correspond to said forward prediction or said backward prediction.

14. The data hiding method as set forth in claim 13, wherein said extraction rule further causes said intraframe coding to correspond to data embedding inhibition.

15. A data extraction method for extracting information with redundancy embedded into an image, comprising the steps of: specifying in said image a plurality of embedding regions embedded with the same data bit;

extracting data bits embedded in said respective embedding regions from characteristics of said respective embedding regions by referring to an extraction rule where a characteristic of said embedding region is caused to correspond to a data bit to be extracted;

when different data bits are extracted from said respective embedding regions, comparing a number of said embedding regions for each of the extracted different data bits, and specifying the data bit with a greater number, as embedded information; and thereby extracting said information with redundancy embedded into an image.

16. A data extraction method for extracting information embedded into an image, comprising the steps of:

specifying in said image a plurality of embedding regions, embedded with a data bit of 1; and extracting the embedded data bit of 1, based on characteristics of the specified plurality of embedding regions, by referring to an extraction rule where a characteristic of said embedding region is caused to correspond to a data bit to be extracted.

17. A motion image coding system for embedding information into an image which is constituted by a plurality of frames and which employs interframe prediction, comprising:

an error calculator for calculating a first prediction error, based on both an embedding region specified in a first frame for embedding information and a reference region in a second frame which is referred to by said embedding region, by employing forward prediction, also calculating a second prediction error, based on both said embedding region and a reference region in a third frame which is referred to by the embedding region, by employing backward prediction, and furthermore calculating a third prediction error, based on said embedding region and reference regions in the second and third frames which are referred to by said embedding region, by employing bidirectional prediction; and a decider for deciding a type of interframe prediction in said embedding region in correspondence with a content of information to be embedded by referring to an embedding rule which prescribes that when one data bit is embedded in said embedding region, said type of interframe prediction in said embedding region employs either said forward prediction or said backward prediction and which also prescribes that when another data bit is embedded in said embedding region, the type of said interframe prediction employs said bidirectional prediction, and for specifying any one of the first, the second, or the third prediction error in correspondence with the decided type of interframe prediction.

18. The motion image coding system as set forth in claim 17, wherein said decider includes first inhibition means which inhibits embedding of data to a certain embedding region when a prediction error in the type of interframe prediction of said certain embedding region, determined based on said embedding rule, exceeds a predetermined threshold value.

19. The motion image coding system as set forth in claim 18, wherein said decider includes second inhibition means which inhibits embedding of data to said embedding region of said bidirectionally predictive-coded frame when a number of references of said forward prediction or a number of references of said backward prediction in said bidirectionally predictive-coded frame is less than a predetermined number.

20. A motion image decoding system for extracting information embedded into a coded motion image, comprising:

a specifier for specifying at least one embedding region embedded with information; and an extractor for extracting said embedded information from a type of said interframe prediction in the embedding region by referring to an extraction rule where the type of said interframe prediction in said embedding region is caused to correspond to a content of data to be embedded.

21. A program storage medium for executing a data hiding process, which embeds information into a motion image constituted by a plurality of frames, by a computer, the program storage medium having the steps of:

specifying in a frame at least one embedding region into which information is embedded; and deciding a type of interframe prediction in said embedding region in correspondence with information to be embedded by referring to an embedding rule where a content of data to be embedded is caused to correspond to the type of interframe prediction in said embedding region.

22. A program storage medium for executing a data extracting process, which extracts information embedded into a coded motion image, by a computer, the program storage medium having the steps of:

specifying in a frame at least one embedding region embedded with said information; and extracting the embedded information in correspondence with a type of interframe prediction in said embedding region by referring to an extraction rule where said type of interframe prediction in said embedding region is caused to correspond to a content of data to be extracted.

\* \* \* \* \*